US006812890B2

(12) United States Patent
Smith et al.

(10) Patent No.: US 6,812,890 B2
(45) Date of Patent: Nov. 2, 2004

(54) VOICE RECOGNITION LANDING FEE BILLING SYSTEM

(75) Inventors: Alexander E. Smith, McLean, VA (US); Robert Bradley, Clifton, VA (US)

(73) Assignee: Rannoch Corporation, Alexandria, VA (US)

(*) Notice: Subject to any disclaimer, the term of this patent is extended or adjusted under 35 U.S.C. 154(b) by 0 days.

(21) Appl. No.: 10/319,725

(22) Filed: Dec. 16, 2002

(65) Prior Publication Data

US 2003/0200138 A1 Oct. 23, 2003

Related U.S. Application Data

(60) Continuation-in-part of application No. 09/971,672, filed on Oct. 9, 2001, now Pat. No. 6,567,043, which is a division of application No. 09/516,215, filed on Feb. 29, 2000.
(60) Provisional application No. 60/343,237, filed on Dec. 31, 2001.

(51) Int. Cl.[7] .............................................. G01S 3/02
(52) U.S. Cl. ...................... 342/454; 342/456; 701/120; 705/400
(58) Field of Search ............................ 342/454, 455, 342/456; 701/120, 121; 705/400, 418

(56) References Cited

U.S. PATENT DOCUMENTS

| 3,705,404 A | 12/1972 | Chisolm ................. 343/112 R |
| 4,167,006 A | 9/1979 | Funatsu et al. ......... 343/6.5 LC |
| 4,196,474 A | 4/1980 | Buchanan et al. .......... 364/461 |
| 4,229,737 A | 10/1980 | Heldwein et al. ........... 343/6 R |

(List continued on next page.)

FOREIGN PATENT DOCUMENTS

| JP | 6-342061 A | 12/1994 |
| JP | 8-146130 A | 5/1996 |
| JP | 9-119983 A | 11/1996 |
| JP | 9-288175 A | 11/1997 |

OTHER PUBLICATIONS

M.L. Wood and R. W. Bush, "Multilateration on Mode S and ATCRBS Signals at Atlanta's Hartsfield Airport", Lincoln Laboratory, Massachusetts Institute of Technology, Jan. 8, 1998.

Traffic Alert System Technical Design Summary, Final Report, Apr. 1994 (Baldwin et al.).

(List continued on next page.)

*Primary Examiner*—Dao Phan
(74) *Attorney, Agent, or Firm*—Robert Platt Bell

(57) ABSTRACT

An apparatus and method are described for generating landing fee and other airport service bills automatically. The system automatically detects aircraft N-number from air traffic control voice data using a voice recognition system and determines aircraft landing and departure events from one or more remote sensor units which determine aircraft vicinity or actual aircraft track. From the landing and departure data and the voice-recognized registration number, the system automatically bills aircraft owners for landing fees based upon this voice recognition as well as upon aircraft position detection.

70 Claims, 2 Drawing Sheets

U.S. PATENT DOCUMENTS

| | | | |
|---|---|---|---|
| 4,454,510 A | 6/1984 | Crow | 343/5 |
| 4,524,931 A | 6/1985 | Nilsson | 246/167 |
| 4,688,046 A | 8/1987 | Schwab | 342/456 |
| 4,782,450 A | 11/1988 | Flax | 364/461 |
| 4,914,733 A | 4/1990 | Gralnick | 340/961 |
| 5,144,315 A | 9/1992 | Schwab et al. | 342/49 |
| 5,153,836 A | 10/1992 | Fraughton et al. | 364/461 |
| 5,191,342 A | 3/1993 | Alsup et al. | 342/465 |
| 5,262,784 A | 11/1993 | Drobnicki et al. | 342/45 |
| 5,365,516 A | 11/1994 | Jandrell | 370/18 |
| 5,374,932 A | 12/1994 | Wyschogrod et al. | 342/36 |
| 5,402,116 A | 3/1995 | Ashley | 340/870.1 |
| 5,454,720 A | 10/1995 | FitzGerald et al. | 434/27 |
| 5,528,244 A | 6/1996 | Schwab | 342/37 |
| 5,570,095 A | 10/1996 | Drouilhet, Jr. et al. | 342/357 |
| 5,596,326 A | 1/1997 | Fitts | 342/36 |
| 5,596,332 A | 1/1997 | Coles et al. | 342/455 |
| 5,627,546 A | 5/1997 | Crow | 342/352 |
| 5,629,691 A | 5/1997 | Jain | 340/961 |
| 5,680,140 A | 10/1997 | Loomis | 342/357 |
| 5,714,948 A | 2/1998 | Farmakis et al. | 340/961 |
| 5,774,829 A | 6/1998 | Cisneros et al. | 701/213 |
| 5,781,150 A | 7/1998 | Norris | 342/357 |
| 5,867,804 A | 2/1999 | Pilley et al. | 701/120 |
| 5,999,116 A | 12/1999 | Evers | 342/36 |
| 6,049,304 A | 4/2000 | Rudel et al. | 342/357.08 |
| 6,085,150 A | 7/2000 | Henry et al. | 701/301 |
| 6,094,169 A | 7/2000 | Smith et al. | 342/465 |
| 6,133,867 A | 10/2000 | Eberwine et al. | 342/29 |
| 6,211,811 B1 | 4/2001 | Evers | 342/36 |
| 6,219,592 B1 | 4/2001 | Muller et al. | 701/9 |
| 6,292,721 B1 | 9/2001 | Conner et al. | 701/9 |
| 6,314,363 B1 | 11/2001 | Pilley et al. | 701/120 |
| 6,347,263 B1 | 2/2002 | Johnson et al. | 701/14 |
| 6,380,870 B1 | 4/2002 | Conner et al. | 340/970 |
| 6,384,783 B1 | 5/2002 | Smith et al. | 342/387 |
| 6,445,310 B1 | 9/2002 | Bateman et al. | 340/970 |
| 6,448,929 B1 | 9/2002 | Smith et al. | 342/456 |
| 6,469,664 B1 | 10/2002 | Michaelson et al. | 342/357.13 |
| 6,477,449 B1 | 11/2002 | Conner et al. | 701/4 |
| 6,571,155 B2 | 5/2003 | Carriker et al. | 701/3 |
| 6,606,034 B1 | 8/2003 | Muller et al. | 340/970 |
| 2002/0009267 A1 | 1/2002 | Dunsky et al. | 701/4 |
| 2003/0069859 A1 * | 4/2003 | Hoffman et al. | 705/400 |

OTHER PUBLICATIONS

Airscene, The complete Air Traffic Picture in Real Time, www.airscene.com, Rannoch Corporation, Alexandria, Virginia, undated.

GPS Relative Accuracy for Collision Avoidance, Institute of Navigation Technical Meeting, Jan. 1997 (Rudel et al.).

Cassell, R., Smith, A., Cohen, B., Yang, E., Sleep, B., A Prototype Aircraft Performance Risk Assessment Model, Final Report, Rannoch Corporation, Feb. 28, 2002.

Cassell, R., Smith A., Cohen, B., Yang, E., Sleep, B., Esche, J., Aircraft Performance Risk Assessment Model (APRAM), Rannoch Corporation, Nov. 30, 2002.

Cox, E., A., Fuzzy Logic For Business and Industry, Charles River Media, 1995, Chapter 5.

Smith, A., Cassell, R., Cohen, B., An approach to Aircraft Performance Risk Assessment Modeling, Final Report, Rannoch Corporation, Mar. 1999.

Protest Letter dated May 6, 2002 from Otto M. Wildensteiner, U.S. Department of Transportation, Washington, DC.

"Comparison of Claims in application Ser. No. 09/971,672, with Prior Art", May 16, 2002, Otto M. Wildensteiner, Department of Transportation, Washington, DC.

"Minimum Aviation System Performance Standards for Automatic Dependent Surveillance Broadcast (ADS–B)", RCTA, Inc. Washington, DC, ©1998.

"Runway Incursion Reduction Program Dallas–Ft. Worth Formal Evaluation Report, Final Report", Trios Associates, Inc. Dec. 21, 2000.

"TIS–B DFW Application for Airport Surface Situational Awareness", Trios Associates, Inc., Sep. 6, 2000.

"A Prototype Transceiver for Evaluating An Integrated Broadcast Data Link Architecture", Chris Moody & Warrant Wilson, RCTA SC–186, Aug. 17, 1995, RCTA Paper No. 449–95/SC186–033.

"The Universal Access Transceiver (UAT)", Warren Wilson & Chris Moody, May 10, 1995.

"Terminal Area Productivity (TAP) Study Low Visibility Landing and Surface Operations (LVLASO) Demonstration Report", Surface Surveillance Products Team (AND–410) Sep. 4, 1998.

Phase I—Operational Evaluation Final Report Cargo Airline Association ADS–B Program, FAA SafeFlight 21 Program Apr. 10, 2000.

"Capstone Program Plan Version 1.0", Federal Aviation Administration, Mar. 10, 1999.

"TIS–B Concept and Approach", MITRE, Chris Moody, Feb. 29, 2000.

"RTCA Special Committee 186, Working Group 5 ADS–B UAT MOPS Meeting #2, Proposed Contents and Transmission Rates for ADS–B Messages" Chris Moody, MITRE Corp., Feb. 20, 2001.

"Airborne Information Initiatives: Capitalizing on a Multi-Purpose Broadcast Communications Architecture", R.C. Strain, J.C. Moody, E.C. Hahn, B.E. Dunbar, S. Kavoussi, J.P. Mittelman, Digital Avionics Systems Conference, Oct. 1995.

"Minutes of SC–186 WG–2 (TIS–B) Meeting", Jun. 13–14, 2000.

"Flight Explorer News: Flight Explorer and Lochard Team to Provide Enhanced Flight Tracking for Cutomers Worldwide", http://www.flightexplorer/com/News/press%20releases/pr042803.asp Apr. 28, 2003.

Aermod: Description of Model Formulation (Version 02222) EPA 454/R–02–002d, Oct. 21, 2002.

FAA Integrated Noise Model, www.faa.gov. current release INM 6.1 (Mar. 4, 2003).

Source Code received by Rannoch Corp. from FAA, circa 1998.

"A Routine that converts an American Mode S address into its corresponding 'N' number string", Ken Banis, Feb. 17, 1992/.

"Description of the U.S. Algorithm for Assigning Mode A Addresses", Robert D. Grappel, M.I.T. Lincoln Laboratory, Nov. 1991.

"Program to convert Mode S address to U.S. Tail Number", R.D. Grappel, M.I.T. Lincoln Laboratory, 1991.

"Program to convert U.S. aircraft tail numbers to Mode S code", R.D. Grappel, M.I.T. Lincoln Laboratory, 1991.

"ADSE and Multilateration Mode–S Data Fusion for Location and Identification on Airport Surface", J.G. Herraro J.A. Portas, F.J. Rodriguez, (*IEEE 1999 Radar Conference Proceedings*, pp. 315–320, Apr. 20–22, 1999).

D.C. Rickard, D.J. Sherry, S.J. Taylor, "The development of a prototype aircraft–height monitoring unit utilising an SSR-based difference in time of arrival technique", International Conference Radar 92 (Conf. Publ. No. 365), 1992, p 250–3.

D. E. Manolakis and C. C. Lefas, "Aircraft geometric height computation using secondary surveillance radar range differences," IEE Proceedings F, Radar, Sonar, Navigation, vol. 141, No. 2, pp. 139–148, 1994.

Request for Proposal, Noise and Operations Monitoring System, Indianpolis Airport Authority, Sep. 29, 2003.

Attachment A: Technical Specifications for an Aircraft Track and Noise Management System, Harris Mill, Miller & Hanson Inc., May 16, 2003.

Application of CNS/ATM Technologies to Airport Management, Alex Smith and Jon Baldwin, (2003).

Overview of the FAA ADS–B Link Decision, John Scardina, Director Office of System Architecture and Investment Analysis, Federal Aviation Administration, Jun. 7, 2002.

Automated Correlation of Aircraft Flight Tracks and Events with ATC Data, Alex Smith, Rannoch Corporation, Alexandria, Virginia.

Department of Transportation Federal Aviation Administration System Specification, Ground–Based Transceiver (GBT) for Broadcast Services Using the Universal Access Transceiver (UAT) Data Link, FAA–E–2973, Jan. 15, 2004.

* cited by examiner

VOICE RECOGNITION LANDING FEE BILLING SYSTEM

CROSS-REFERENCE TO RELATED APPLICATIONS

The present application claims priority from Provisional U.S. Patent Application Ser. No. 60/343,237, filed Dec. 31, 2001, and incorporated herein by reference.

The present application is a Continuation-In-Part (CIP) application of U.S. patent application Ser. No. 09/516,215, entitled METHOD AND APPARATUS FOR IMPROVING THE UTILITY OF AUTOMATIC DEPENDENT SURVEILLANCE, filed Feb. 29, 2000, and incorporated herein by reference.

The present application is also a Continuation-In-Part (CIP) application of U.S. patent application Ser. No. 09/971,672, entitled METHOD AND APPARATUS FOR IMPROVING THE UTILITY OF AUTOMATIC DEPENDENT SURVEILLANCE, filed Oct. 9, 2001 now U.S. Pat. No. 6,567,043 and incorporated herein by reference.

The subject matter of the present invention is related to that in the following copending U.S. Applications, all of which are incorporated herein by reference:

METHOD AND APPARATUS FOR IMPROVING THE UTILITY OF AUTOMATIC DEPENDENT SURVEILLANCE (Smith et al.), Ser. No. 09/516,215, filed Feb. 29, 2000;

METHOD FOR PROVIDING AIRCRAFT-BASED RUNWAY INCURSION ALERTS (Rick CASSELL et al.), Ser. No. 09/833,736 filed Apr. 13, 2001; and METHOD AND APPARATUS FOR IMPROVING THE UTILITY OF AUTOMATIC DEPENDENT SURVEILLANCE (Smith et al.), Ser. No. 09/971,672, filed Oct. 9, 2001.

The subject matter of the present application is also related to the following issued U.S. patents, all of which are incorporated herein by reference:

Method and Apparatus for Correlating Flight Identification Data With Secondary Surveillance Radar Data (Smith et al.), U.S. Pat. No. 6,448,929, issued Sep. 10, 2002;

Method and Apparatus for Correlating Flight Identification Data With Secondary Surveillance Radar Data (Smith et al.), U.S. Pat. No. 6,384,783, issued May 7, 2002;

Method and Apparatus for Improving the Accuracy of Relative Position Estimates In a Satellite-Based Navigation System (Rudel), U.S. Pat. No. 6,049,304 issued Apr. 11, 2000;

Method and Apparatus for Improving the Surveillance Coverage and Target Identification in a Radar Based Surveillance System (Evers), U.S. Pat. No. 5,999,116 issued Dec. 7, 1999;

Passive Multilateration Auto-Calibration and Position Error Correction (Lee), U.S. Pat. No. 6,094,169 issued Jul. 25, 2000; and Method and Apparatus for Improving the Surveillance Coverage and Target Identification in a Radar Based Surveillance System (Evers), U.S. Pat. No. 6,211,811, issued Apr. 3, 2001.

FIELD OF THE INVENTION

The present invention relates to an apparatus and method for generating landing fee and other airport service bills automatically. In particular, the present invention is directed toward a system and method for automatically detecting aircraft N-number from air traffic control voice data using a voice recognition system, and automatically billing aircraft owners for landing fees based upon this voice recognition as well as upon aircraft position detection.

BACKGROUND OF THE INVENTION

The issued U.S. patents and pending applications incorporated by reference above disclose techniques for detecting aircraft position by receiving aircraft radio signals (e.g., mode-S, mode-A, or mode-C transponder or the like) at a multitude of local receivers and detecting aircraft position based upon Time Difference of Arrival (TDOA) or other multilateration or other techniques. Thus, systems are known (at least to the present inventors) for detecting aircraft position using various techniques.

Airports collect revenues in a number of ways. In addition to airport ticket taxes, concession fees, hangar rent, and the like, airports collect landing fees from each aircraft landing at a particular airport. For larger airports handing mostly scheduled commercial (airline) traffic, calculating these landing fees and billing for them is a relatively simple process. Airlines run with preset schedules available to the airport operator, and moreover, detailed landing logs are kept as part of Air Traffic Control records.

However, for many smaller and midsize airports, monitoring and collecting landing fees can be quite difficult. General Aviation, Tour, Charter, Flight Instruction, and Regional Airliner aircraft may arrive and depart at unscheduled times. Moreover, aircraft which are not based at the airport or which do not regularly fly to the airport may land perhaps once. Without detailed aircraft ownership records and landing records, it may be difficult to account for, bill for, and collect landing fees.

The problem of collecting landing fees is not trivial. In one airport utilizing the system of the present invention, collected landing fees nearly doubled after installation. As such, it may be typical that as much as half of all landing fees in small to medium sized airports are never logged, billed, or collected.

In a small or midsize airport, the amount of staff available for landing fee collection may be limited or non-existent. Air Traffic Control personnel (e.g., tower personnel) may be the only method of logging and collecting landing fees. Since the other personnel are more concerned with safe airport operation than billing, landings may fail to be properly logged, particularly during busy periods (e.g., more than one plane in landing pattern, or the like).

As noted above, techniques exist for detecting the presence or location of an aircraft using radio receivers to monitor transponder frequencies (e.g., Mode-C and/or Mode-S transponders) Most general aviation aircraft are equipped with such transponders. Moreover, even if not equipped with a transponder, a general aviation aircraft will most likely be equipped with a radio for verbal communication with the tower. Thus, most general aviation aircraft will emit some type of radio signal when in the vicinity of the airport.

SUMMARY OF THE INVENTION

The present invention monitors aircraft position or vicinity by receiving aircraft radio signals. Position can be determined by measuring Time Difference of Arrival (TDOA) or in the alterative, vicinity can be measured simply by intensity of radio signal. When the position of an aircraft is determined to be within range of the airport, and the aircraft descends to the level and location of the airport, the system determines that a landing has occurred.

If the signal monitored is a Mode-S signal, aircraft registration ("N" number) may be decoded from the Mode-S signal using a predetermined algorithm. However, many general aviation (GA) aircraft still utilize mode C or mode A transponders which do not provide N-number information and cannot be decoded to provide N-number information.

Thus, the system also monitors the Air Traffic Control (ATC) or tower signals for audio signals from the tower controller audio signals. In the preferred embodiment, the system can tap directly into the tower radio to receive a high quality "clean" audio signal without interference. In an alternative embodiment, the system may monitor tower frequencies to capture tower audio signal data.

A voice recognition system receives tower voice signals and outputs text data. In particular, the system monitors tower voice signals for recitation of aircraft registration number ("N" number) by the tower controller. The system then matches N number with the aircraft landing to generate a billing event.

From an aircraft owner's database (e.g., FAA records or the like), the system can generate a complete landing fee billing statement, complete with aircraft owner address, ready to be mailed or given to the aircraft owner. The billing system may also be provided with, or interface with, other known billing features (e.g., Accounts Receivable statements and other accounting features).

The system may be provided with fail-safe features to prevent multiple billing for the same landing event. For example, the number of billing events for a given N-number aircraft may be limited per unit time to prevent double-billing for the same landing. Thus, for example, and aircraft may be limited to one landing bill per half hour or other increment of time. If an aircraft has to abort a landing and go around to land again, the system will recognize such an event and may bill for only one landing.

For special aircraft operations, such as flight schools, skydiving services, crop dusting, air taxi, sight seeing tours, and the like, where multiple take-offs and landings may occur within a certain time period, a pre-arrange flat rate may be negotiated, or the system may be programmed to log predetermined N-number aircraft with a different frequency than general aircraft.

DETAILED DESCRIPTION OF THE INVENTION

The present invention may utilize components of the AirScene® system sold by Rannoch Corporation of Alexandria, Va., assignee of the present application. Aspects of the AirScene® system may be described in the patents and pending applications incorporated by reference.

AirScene® is a scalable solution that is used to track aircraft for a variety of applications. The system receives transponder information transmitted by an aircraft and calculates position by a process known as multilateration (or triangulation). The system also decodes all of the transponder signals and can therefore determine altitude and identification of each aircraft.

A thorough description of the AirScene® system is provided for reference in the Appendix of Provisional Patent Application Ser. No. 60/343,237, filed Dec. 21, 2001, and incorporated herein by reference. Because AirScene® is scalable, the system can be tailored from very large international airports to smaller GA type airports. Rannoch Corporation, the assignee of the present application, has deployed various versions of the system to numerous airports ranging from Calgary, Providence, Tokyo, to Hyannis, and other smaller airports such as Cincinnati Lunken Municipal.

Figure 1:
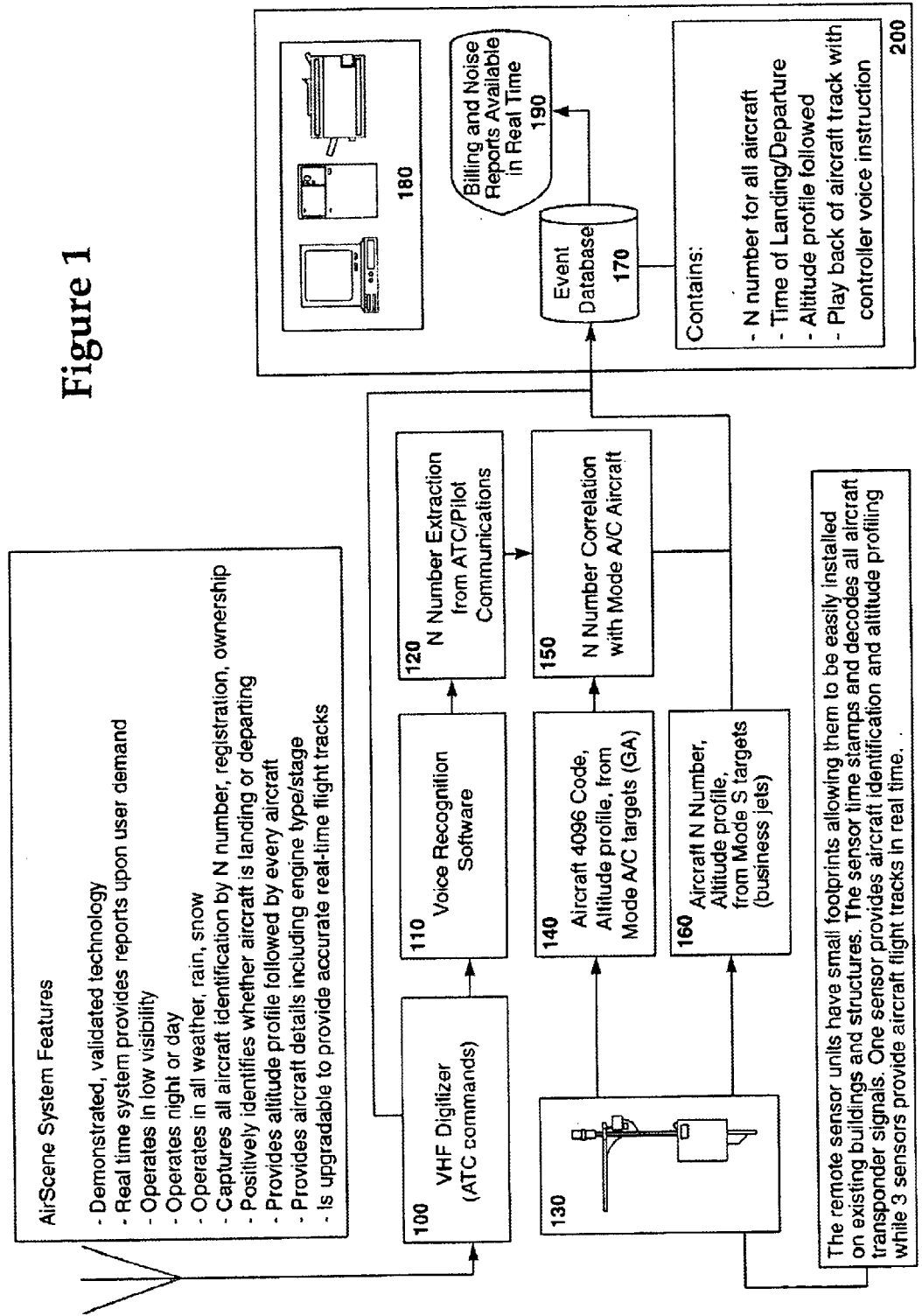
FIG. 1 is a block diagram of the preferred embodiment of the present invention.

FIG. 1 is a block diagram of the present invention. Based on the requirements provided and the scope of the project, a tailored AirScene® system may be utilized to implement the automated landing fee billing system of the present invention. The two main sensors may be used include one for aircraft transponder signals and another for VHF pilot/controller communications.

VHF digitizer 100 may receive VHF radio voice signals, such as air traffic control (ATC) commands and pilot responses and convert them into digitized data signals. Voice recognition software 110 may then receive this digitized data. In block 120, N number (registration number) data may be extracted from the digitized ATC and pilot communications.

The second input may comprise one or more remote sensor units constructed according to the AirScene® product and in conjunction with the various patents and pending applications cited above and incorporated by reference. These remote sending units have small footprints allowing them to be easily installed on existing buildings and structures. The sensor time-stamps and decodes all aircraft transponder signals.

One sensor provides aircraft identification and altitude profiling while three sensors provide aircraft flight tracks in real time. For the landing fee system of the present invention, a single sensor could be used (registering 0 altitude as a landing). For an airport in a congested area (e.g., multiple airports in the area), multiple sensors could be used to track aircraft and determine when such aircraft have actually landed at the facility of interest.

In addition, the present invention may be interfaced with conventional radar tracking systems and the like to obtain aircraft position and altitude data. However, one advantage of the present invention is the ability to provide a landing billing system which is independent of aircraft ATC radar, thus eliminating any safety concerns in tapping into FAA radar equipment.

In block 140, the aircraft 4096 code and/or altitude profile may be decoded from mode A and C targets (e.g., for general aviation (GA) aircraft). In block 150, N number (or other type of aircraft registration number for foreign registered aircraft) may be correlated with mode A and C aircraft. Alternately, or in conjunction with block 140, aircraft N number, altitude profile may be decoded from mode S targets (e.g., business and commercial jets) in block 160.

N number correlation data and digitized voice data may then be fed to event database 170. Event database 170, part of system 200 contains a database of all N numbers for all aircraft, and stores time of landing an/or departure, altitude profile (and/or track) followed, playback of aircraft track with controller voice instruction. From the database of N numbers, the name and address of owners of each aircraft can be obtained. Such N number data can be obtained from a number of database sources, including the FAA and other sources. Foreign aircraft registry data can be obtained from foreign government and other sources.

By storing all of this data in database 170, proof of aircraft landing and departure can be maintained if an aircraft owner disputes a landing charge invoice. Billing and noise report generator 190 may generate landing fee invoices, billing reports, receipts and the like through computer system 180. In addition, billing and noise report generator 190 may generate aircraft noise violation reports by correlating flight track information with noise data gathered from acoustical transducers (not shown) located in the vicinity of the airport.

As discussed above, the transponder signals decoded from remote sensor 130 and time stamped and may be either be Mode S or Mode A/C signals, in Block 160, mode S signals contain the aircraft's N number, which may then be saved in the event database 170 along with the aircraft's flight profile. The flight profile may then be taken from the altitude information in the transponder signals. In block 140, for Mode A/C aircraft, the only available information may be the 4096 code and the flight profile which is also stored in the event database 170 and correlated with the N number in block 150 from the VHF communications. The VHF digitizer 100 allows pilot/ATC communications to be stored and archived on disk.

Figure 2:
FIG. 2 illustrates an example of an actual invoice generated using the system and method of the present invention.

The voice recognition software in block 110 is used to capture the N number use in communications for Mode A/C aircraft and then correlated with the flight track, based on the VHF frequency used—ground, approach, and the like. The resulting report is a real time analysis of aircraft N number, time, approach or departure, and flight profile. Examples of such reports and actual invoices are disclosed in the Appendix of Provisional U.S. Patent Application Ser. No. 60/343, 237, filed Dec. 21, 2001, and incorporated by reference above. An example of an actual invoice generated from the present invention is illustrated in FIG. 2.

Because altitude profile is collected from every aircraft, the aircraft can be positively identified as arriving or departing. This is possible even with a single AirScene® receiver station. In addition, an aircraft's altitude profile is very useful in investigating noise complaints, (e.g., determining whether the aircraft was following STAR/SID abatement procedures). Noise complaints from citizens can be correlated to specific aircraft flight paths. In addition, noise data from acoustical transducers (not shown) placed in strategic positions around an airport can be correlated to specific aircraft and aircraft registration numbers.

In addition to altitude, a three receiver system may also provide an accurate three-dimensional aircraft track for a complete assessment of an aircraft's adherence to noise abatement procedures. All of the technology components have been deployed and demonstrated on other AirScene® systems disclosed in the patents and pending applications cited above.

The AirScene® Approach to documenting aircraft landing and departures is based upon a demonstrated, validated technology. The real time system provides reports upon user demand. The system operates in low light and low visibility conditions, night or day. This is particularly useful, as aircraft noise tends to be more of a problem during heavy overcast and lower visibility conditions. The system captures all aircraft identification by N number, registration, and ownership and positively identifies whether aircraft is landing or departing. Moreover, the system provides altitude profile followed by every aircraft as well as aircraft details including engine type and stage. In addition, the system operates in wet weather and in snow and is easy to site and install, and is upgradeable to provide accurate real-time flight tracks.

The following is a description of the Landing Algorithm used by the system of the present invention. Source code for this algorithm, along with a database and other supporting materials are presented the Appendix of Provisional Patent Application Ser. No. 60/343,237, filed Dec. 21, 2001, and incorporated herein by reference and is also presented in the CD-ROM Appendix attached herewith.

General Description—The landing algorithm is designed to determine when Mode S or Mode A/C aircraft land. The Rannoch Secondary Surveillance Radar Decoding System (SSRD) provides Mode S and Mode A/C raw data to the collaboration module of Landing Fee Administration System (LFAS) in near real-time, which builds altitude profiles of aircraft and Mode S aircraft registration number on the fly.

For Mode S aircraft, data is extracted from known Mode S message formats. For Mode A/C aircraft, radar data is first processed as Mode C data to decode altitude. If it turns out to be invalid, it is reprocessed as Mode A data to decode the Squawk Code. For Mode A/C aircraft, the Rannoch Voice Recognition module retrieves the aircraft registration number and landing commands from Air Traffic Controller-Pilot communication in real time. The collaboration rules are designed to match aircraft registration numbers with Mode A/C aircraft profiles. Sensitivity levels are customized to local environment to assure only local traffic is processed.

Landing Criteria—The landing algorithm browses through the aircraft altitude profile data, and determines whether it lands with respect to the first spot in the altitude profile (FirstSpotAlt), the minimum altitude in the altitude profile (MinSpotAlt), and the last spot in the altitude profile (LastSpotAlt).

If all following expressions are true, then the aircraft is deemed to have landed:

$$FirstSpotAlt-LastSpotAlt > Constant1$$

$$LastSpotAlt < Constant2$$

$$LastSpotAlt-MinSpotAlt < Constant3$$

Note: Constant1, Constant2, Constant3 are airport related data. For instance, Constant1, Constant2 and Constant3 are set as 500, 1100, 100 in the preferred embodiment as implemented in Cincinnati's Lunken airport.

Collaboration Rules—The voice independent recognition module is designed to recognize a limited dictionary of words designed to identify the aircraft tail number associated with a Mode A/C landing. The dictionary includes: Zero, One, Two, Three, Four, Five, Six, Seven, Eight, Nine, Ten, Eleven, Twelve, Thirteen, Fourteen, Fifteen, Sixteen, Seventeen, Eighteen, Nineteen, Twenty, Thirty, Forty, Fifty, Sixty, Seventy, Eighty, Ninety, Hundred, Thousand, Clear to Land, alpha, bravo, charlie, delta, echo, foxtrot, golf, hotel, india, juliett, kilo, lima, mike, november, oscar, papa, quebec, romeo, sierra, tango, uniform, victor, whiskey, xray, yankee, and zulu.

By using a voice recognition dictionary, the voice recognition system looks for particular words in the digitized data stream which are related to aircraft registration numbers, landing instructions, and the like. A higher level of accuracy may be obtained in voice recognition by using a dictionary of limited vocabulary, as opposed to using voice recognition for all words and then searching text for registration numbers and the like.

The program correlates the partial aircraft tail number extractions with actual aircraft tail number, using rule-based logic and an appropriate hierarchy of aircraft databases as illustrated in FIG. 1. Confidence levels are assigned based on the database associated with the voice extraction. The program correlates extracted data with local aircraft inventory databases, previous landing databases, and US/International aircraft databases in order to determine valid N number. Based on a confidence level exceeding a predetermined level, a landing fee is generated.

The Appendices set forth in Provisional U.S. Patent Application Ser. No. 60/343,237, filed Dec. 21, 2001, and incorporated above by reference include examples of landing fee invoices generated by the present invention (also illustrated in FIG. 2 herein), as well as technical descriptions of the present invention and source code of the computer algorithm.

While the preferred embodiment and various alternative embodiments of the invention have been disclosed and described in detail herein, it may be apparent to those skilled in the art that various changes in form and detail may be made therein without departing from the spirit and scope thereof.

For example, while the system of the present invention may be utilized in the preferred embodiment to invoice for landing fees, other types of fees may be automatically generated using the apparatus of the present invention, including, but not limited to, fuel bills, aircraft noise violation fines, ramp services, ramp parking fees, hangar rental fees, and the like.

The technique of the present invention may also be applied to digital data link as well as analog voice data link. Future communications between ATC and aircraft may be performed exclusively or to a great extent by digital communications. Digital offers the ability to selectively address messages and to make better use of communications bandwidth. In addition, it has the potential to improve the accuracy of communications and minimize any misunderstanding between the pilot and the controller.

One such digital communication link is the Controller Pilot Data Link Communication (CPDLC) which has messages defined in the International Civil Aviation Authority's Aeronautical Telecommunications Network (ATN) Standards and Recommended Practices (SARPS). See, e.g., ICAO, 1998, Manual of Technical Provisions for the Aeronautical Telecommunications Network (ATN), $1^{st}$ Edition, ICAO Document 9705-AN/956, ICAO, Montreal, Canada.

The automated billing application may use the identification from the digital data link as well as the identification from an analog voice channel. Voice recognition might not be required for this application as the aircraft's identification may be provided digitally, and could be used directly in the automated billing system. Alternately, digitized voice data may be input into the system of FIG. 1, bypassing digitizer step 100. In other respects, a digital embodiment of the present invention may operate in a manner similar to that disclosed above in connection with the analog system.

We claim:

1. A system for automatically logging aircraft landings and departures, comprising:
   means for monitoring aircraft location to determine if an aircraft has landed at an airport;
   means for decoding aircraft identification data from radio signals generated by the aircraft; and
   means for matching aircraft identification data with the aircraft landing to generate a billing event.

2. The system of claim 1, wherein said means for monitoring aircraft location comprises:
   means for monitoring aircraft vicinity from received aircraft radio signals by measuring intensity of aircraft radio signals, such that when the intensity of the aircraft radio signals are above a predetermined threshold, an aircraft is determined to have landed.

3. The system of claim 1, wherein said means for monitoring aircraft location comprises:
   means for monitoring aircraft position from received aircraft radio signals measuring Time Difference of Arrival (TDOA) such that when the position of an aircraft is determined to be within range of the airport, and the aircraft descends to the level and location of the airport, an aircraft is determined to have landed.

4. The system of claim 1, where said means for decoding aircraft identification data comprises:
   means for monitoring a Mode-S signal from an aircraft and decoding aircraft identification data from the Mode-S signal.

5. The system of claim 4, wherein the aircraft identification data comprises an aircraft registration number, and the aircraft registration number is determined from the Mode-S signal using a predetermined algorithm.

6. The system of claim 1, where said means for decoding aircraft identification data comprises:
   means for monitoring Air Traffic Control (ATC) signals for audio signals from a tower controller; and
   a voice recognition system for receiving the monitored ATC signals and outputting an aircraft identification data.

7. The system of claim 6, wherein the aircraft identification data comprises aircraft registration data.

8. The system of claim 1, where said means for decoding aircraft identification data comprises:
   means for monitoring tower signals for audio signals from the tower controller audio signals; and
   a voice recognition system for receiving the monitored tower signals and outputting an aircraft identification data.

9. The system of claim 8, wherein the aircraft identification data comprises aircraft registration data.

10. The system of claim 1, where the means for matching aircraft identification data with the aircraft landing to generate a billing event comprises:
    means for generating, from an aircraft owner's database, a landing fee billing statement to be given to the aircraft owner.

11. The system of claim 2, where said means for decoding aircraft identification data comprises:
    means for monitoring a Mode-S signal from an aircraft and decoding aircraft identification data from the Mode-S signal.

12. The system of claim 11, wherein the aircraft identification data comprises an aircraft registration number, and the aircraft registration number is determined from the Mode-S signal using a predetermined algorithm.

13. The system of claim 2, where said means for decoding aircraft identification data comprises:
    means for monitoring Air Traffic Control (ATC) signals for audio signals from a tower controller; and
    a voice recognition system for receiving the monitored ATC signals and outputting an aircraft identification data.

14. The system of claim 13, wherein the aircraft identification data comprises aircraft registration data.

15. The system of claim 2, where said means for decoding aircraft identification data comprises:

means for monitoring tower signals for audio signals from the tower controller audio signals; and a voice recognition system for receiving the monitored tower signals and outputting an aircraft identification data.

16. The system of claim 15, wherein the aircraft identification data comprises aircraft registration data.

17. The system of claim 2, where the means for matching aircraft identification data with the aircraft landing to generate a billing event comprises:

means for generating, from an aircraft owner's database, a landing fee billing statement to be given to the aircraft owner.

18. The system of claim 3, where said means for decoding aircraft identification data comprises:

means for monitoring a Mode-S signal from an aircraft and decoding aircraft identification data from the Mode-S signal.

19. The system of claim 18, wherein the aircraft identification data comprises an aircraft registration number, and the aircraft registration number is determined from the Mode-S signal using a predetermined algorithm.

20. The system of claim 3, where said means for decoding aircraft identification data comprises:

means for monitoring Air Traffic Control (ATC) signals for audio signals from a tower controller; and a voice recognition system for receiving the monitored ATC signals and outputting an aircraft identification data.

21. The system of claim 20, wherein the aircraft identification data comprises aircraft registration data.

22. The system of claim 3, where said means for decoding aircraft identification data comprises:

means for monitoring tower signals for audio signals from the tower controller audio signals; and a voice recognition system for receiving the monitored tower signals and outputting an aircraft identification data.

23. The system of claim 22, wherein the aircraft identification data comprises aircraft registration data.

24. The system of claim 3, where the means for matching aircraft identification data with the aircraft landing to generate a billing event comprises:

means for generating, from an aircraft owner's database, a landing fee billing statement to be given to the aircraft owner.

25. The system of claim 4, wherein said means for monitoring aircraft location comprises:

means for monitoring aircraft vicinity from received aircraft radio signals by measuring intensity of aircraft radio signals, such that when the intensity of the aircraft radio signals are above a predetermined threshold, an aircraft is determined to have landed.

26. The system of claim 4, wherein said means for monitoring aircraft location comprises:

means for monitoring aircraft position from received aircraft radio signals measuring Time Difference of Arrival (TDOA) such that when the position of an aircraft is determined to be within range of the airport, and the aircraft descends to the level and location of the airport, an aircraft is determined to have landed.

27. The system of claim 4, where said means for decoding aircraft identification data further comprises:

means for monitoring tower signals for audio signals from the tower controller audio signals; and a voice recognition system for receiving the monitored tower signals and outputting an aircraft identification data.

28. The system of claim 27, wherein the aircraft identification data comprises aircraft registration data.

29. The system of claim 4, where the means for matching aircraft identification data with the aircraft landing to generate a billing event comprises:

means for generating, from an aircraft owner's database, a landing fee billing statement to be given to the aircraft owner.

30. The system of claim 6, wherein said means for monitoring aircraft location comprises:

means for monitoring aircraft vicinity from received aircraft radio signals by measuring intensity of aircraft radio signals, such that when the intensity of the aircraft radio signals are above a predetermined threshold, an aircraft is determined to have landed.

31. The system of claim 6, wherein said means for monitoring aircraft location comprises:

means for monitoring aircraft position from received aircraft radio signals measuring Time Difference of Arrival (TDOA) such that when the position of an aircraft is determined to be within range of the airport, and the aircraft descends to the level and location of the airport, an aircraft is determined to have landed.

32. The system of claim 6, where the means for matching aircraft identification data with the aircraft landing to generate a billing event comprises:

means for generating, from an aircraft owner's database, a landing fee billing statement to be given to the aircraft owner.

33. The system of claim 8, wherein said means for monitoring aircraft location comprises:

means for monitoring aircraft vicinity from received aircraft radio signals by measuring intensity of aircraft radio signals, such that when the intensity of the aircraft radio signals are above a predetermined threshold, an aircraft is determined to have landed.

34. The system of claim 8, wherein said means for monitoring aircraft location comprises:

means for monitoring aircraft position from received aircraft radio signals measuring Time Difference of Arrival (TDOA) such that when the position of an aircraft is determined to be within range of the airport, and the aircraft descends to the level and location of the airport, an aircraft is determined to have landed.

35. The system of claim 8, where the means for matching aircraft identification data with the aircraft landing to generate a billing event comprises:

means for generating, from an aircraft owner's database, a landing fee billing statement to be given to the aircraft owner.

36. A method for automatically logging aircraft landings and departures, comprising the steps of:

monitoring aircraft location to determine if an aircraft has landed at an airport, decoding aircraft identification data from radio signals generated by the aircraft, and matching aircraft identification data with the aircraft landing to generate a billing event.

37. The method of claim 36, wherein said step of monitoring aircraft location comprises the steps of:

monitoring aircraft vicinity from received aircraft radio signals, and measuring intensity of aircraft radio signals such that when the intensity of the aircraft radio signals are above a predetermined threshold, an aircraft is determined to have landed.

38. The method of claim 36, wherein said step of monitoring aircraft location comprises the steps of:

monitoring aircraft position from received aircraft radio signals measuring Time Difference of Arrival CTDOA), determining an aircraft to be in range of an airport from TDOA data, determining the aircraft to have descended to the level and location of the airport from TDOA data, and determining the aircraft has landed when the aircraft has been determined to be in range of the airport and descended to the level and location of the airport.

39. The method of claim 36, where said step of decoding aircraft identification data comprises the steps of:

monitoring a Mode-S signal from an aircraft, and decoding aircraft identification data from the Mode-S signal.

40. The method of claim 39, wherein the aircraft identification data comprises an aircraft registration number, and said step of decoding aircraft identification data comprises the step of decoding the aircraft registration number from the Mode-S signal using a predetermined algorithm.

41. The method of claim 36, where said step of decoding aircraft identification data comprises the steps of:

monitoring Air Traffic Control (ATC) signals for audio signals from a tower controller, and receiving the monitored ATC signals in a voice recognition system and outputting an aircraft identification data.

42. The method of claim 41, wherein the aircraft identification data comprises aircraft registration data.

43. The method of claim 36, where said step of decoding aircraft identification data comprises the steps of:

monitoring tower signals for audio signals from the tower controller audio signals, and receiving the monitored tower signals in a voice recognition system and outputting an aircraft identification data.

44. The method of claim 43, wherein the aircraft identification data comprises aircraft registration data.

45. The method of claim 36, where said step of matching aircraft identification data with the aircraft landing to generate a billing event comprises the step of:

generating, from an aircraft owner's database, a landing fee billing statement to be given to the aircraft owner.

46. The method of claim 37, where said step of decoding aircraft identification data comprises the steps of:

monitoring a Mode-S signal from an aircraft, and decoding aircraft identification data from the Mode-S signal.

47. The method of claim 36, wherein the aircraft identification data comprises an aircraft registration number, and said step of decoding aircraft identification data comprises the step of decoding the aircraft registration number from the Mode-S signal using a predetermined algorithm.

48. The method of claim 37, where said step of decoding aircraft identification data comprises the steps of:

monitoring Air Traffic Control (ATC) signals for audio signals from a tower controller, and receiving the monitored ATC signals in a voice recognition system and outputting an aircraft identification data.

49. The method of claim 48, wherein the aircraft identification data comprises aircraft registration data.

50. The method of claim 37, where said step of decoding aircraft identification data comprises the steps of:

monitoring tower signals for audio signals from the tower controller audio signals, and receiving the monitored tower signals in a voice recognition system and outputting an aircraft identification data.

51. The method of claim 50, wherein the aircraft identification data comprises aircraft registration data.

52. The method of claim 37, where said step of matching aircraft identification data with the aircraft landing to generate a billing event comprises the step of:

generating, from an aircraft owner's database, a landing fee billing statement to be given to the aircraft owner.

53. The method of claim 38, where said step of decoding aircraft identification data comprises the steps of:

monitoring a Mode-S signal from an aircraft, and decoding aircraft identification data from the Mode-S signal.

54. The method of claim 53, wherein the aircraft identification data comprises an aircraft registration number, and said step of decoding aircraft identification data comprises the step of decoding the aircraft registration number from the Mode-S signal using a predetermined algorithm.

55. The method of claim 38, where said step of decoding aircraft identification data comprises the steps of:

monitoring Air Traffic Control (ATC) signals for audio signals from a tower controller, and receiving the monitored ATC signals in a voice recognition system and outputting an aircraft identification data.

56. The method of claim 55, wherein the aircraft identification data comprises aircraft registration data.

57. The method of claim 38, where said step of decoding aircraft identification data comprises the steps of:

monitoring tower signals for audio signals from the tower controller audio signals, and receiving the monitored tower signals in a voice recognition system and outputting an aircraft identification data.

58. The method of claim 57, wherein the aircraft identification data comprises aircraft registration data.

59. The method of claim 38, where said step of matching aircraft identification data with the aircraft landing to generate a billing event comprises the step of:

generating, from an aircraft owner's database, a landing fee billing statement to be given to the aircraft owner.

60. The method of claim 39, wherein said step of monitoring aircraft location comprises the steps of:

monitoring aircraft vicinity from received aircraft radio signals, and measuring intensity of aircraft radio signals such that when the intensity of the aircraft radio signals are above a predetermined threshold, an aircraft is determined to have landed.-

61. The method of claim 39, wherein said step of monitoring aircraft location comprises the steps of:
  monitoring aircraft position from received aircraft radio signals measuring Time Difference of Arrival (TDOA),
  determining an aircraft to be in range of an airport from TDOA data,
  determining the aircraft to have descended to the level and location of the airport from TDOA data, and
  determining the aircraft has landed when the aircraft has been determined to be in range of the airport and descended to the level and location of the airport.

62. The method of claim 39, where said step of decoding aircraft identification data further comprises the steps of:
  monitoring tower signals for audio signals from the tower controller audio signals, and
  receiving the monitored tower signals in a voice recognition system and outputting an aircraft identification data.

63. The method of claim 62, wherein the aircraft identification data comprises aircraft registration data.

64. The method of claim 39, where said step of matching aircraft identification data with the aircraft landing to generate a billing event comprises the step of:
  generating, from an aircraft owner's database, a landing fee billing statement to be given to the aircraft owner.

65. The method of claim 41, wherein said step of monitoring aircraft location comprises the steps of:
  monitoring aircraft vicinity from received aircraft radio signals, and
  measuring intensity of aircraft radio signals such that when the intensity of the aircraft radio signals are above a predetermined threshold, an aircraft is determined to have landed.

66. The method of claim 41, wherein said step of monitoring aircraft location comprises the steps of:
  monitoring aircraft position from received aircraft radio signals measuring Time Difference of Arrival (TDOA),
  determining an aircraft to be in range of an airport from TDOA data,
  determining the aircraft to have descended to the level and location of the airport from TDOA data, and
  determining the aircraft has landed when the aircraft has been determined to be in range of the airport and descended to the level and location of the airport.

67. The method of claim 41, where said step of matching aircraft identification data with the aircraft landing to generate a billing event comprises the step of:
  generating, from an aircraft owner's database, a landing fee billing statement to be given to the aircraft owner.

68. The method of claim 43, wherein said step of monitoring aircraft location comprises the steps of:
  monitoring aircraft vicinity from received aircraft radio signals, and
  measuring intensity of aircraft radio signals such that when the intensity of the aircraft radio signals are above a predetermined threshold, an aircraft is determined to have landed.

69. The method of claim 43, wherein said step of monitoring aircraft location comprises the steps of:
  monitoring aircraft position from received aircraft radio signals measuring Time Difference of Arrival (TDOA),
  determining an aircraft to be in range of an airport from TDOA data,
  determining the aircraft to have descended to the level and location of the airport from TDOA data, and
  determining the aircraft has landed when the aircraft has been determined to be in range of the airport and descended to the level and location of the airport.

70. The method of claim 43, where said step of matching aircraft identification data with the aircraft landing to generate a billing event comprises the step of:
  generating, from an aircraft owner's database, a landing fee billing statement to be given to the aircraft owner.

* * * * *